(12) United States Patent
Uesugi

(10) Patent No.: US 6,404,827 B1
(45) Date of Patent: Jun. 11, 2002

(54) METHOD AND APPARATUS FOR LINEAR PREDICTING

(75) Inventor: Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/313,990

(22) Filed: May 19, 1999

(30) Foreign Application Priority Data

May 22, 1998 (JP) .......................................... 10-141231

(51) Int. Cl.⁷ ............................................... H03D 1/00
(52) U.S. Cl. ...................... 375/340; 375/347; 704/262
(58) Field of Search .............................. 375/262, 340, 375/341, 347, 350; 704/262

(56) References Cited

U.S. PATENT DOCUMENTS

| | | | |
|---|---|---|---|
| 4,870,579 A | | 9/1989 | Hey |
| 5,249,200 A | * | 9/1993 | Chen et al. ................. 329/349 |
| 5,295,136 A | | 3/1994 | Ashley et al. |
| 5,432,821 A | * | 7/1995 | Polydoros et al. .......... 375/340 |
| 5,546,430 A | | 8/1996 | Liao et al. .................. 375/233 |
| 5,677,951 A | * | 10/1997 | Gay ............................. 370/290 |
| 6,061,444 A | * | 5/2000 | Kawahara et al. ..... 379/406.08 |

FOREIGN PATENT DOCUMENTS

| | | |
|---|---|---|
| JP | 6104797 | 4/1994 |
| JP | 7-95107 | 4/1995 |
| JP | 7-235896 | 9/1995 |
| JP | 7336278 | 12/1995 |
| JP | 8-8786 | 1/1996 |
| JP | 8130565 | 5/1996 |
| JP | 8-331025 | 12/1996 |
| JP | 9-8710 | 1/1997 |
| JP | 9-294095 | 11/1997 |

OTHER PUBLICATIONS

A Japanese Language abstract of JP 8–130565.
A Japanese Language abstract of JP 7–336278.
An article entitled "The Linear Predictive Estimation in the Rake for Multipath–Fading Channel with White Noise of General Distributions", by Shen et al., Global Telecommunication Conference, GLOBECOM 1994, vol. 3, pp. 1612–1616.
English Language Abstract of JP 7–95107.
English Language Abstract of JP 7–235896.
English Language Abstract of JP 8–8786.
English Language Abstract of JP 8–331025.
English Language Abstract of JP 9–8710.
English Language Abstract of JP 9–294095.

* cited by examiner

Primary Examiner—Don N. Vo
(74) Attorney, Agent, or Firm—Greenblum & Bernstein, P.L.C.

(57) ABSTRACT

In the receiver of the present invention, it is after weighting every observed value with corresponding likelihood at every observation points that a least square method is utilized as a linear prediction to the observations, in order to improve the accuracy of the linear prediction by making the influence of the probable observed values to the prediction result larger. The present invention can improve the accuracy of received signal correction in a receiver, by making a linear prediction more reliable, which is applied for frequency offset compensation, phase shift compensation, synchronization shift adjustment, combined diversity and other signal values estimation.

12 Claims, 6 Drawing Sheets

METHOD AND APPARATUS FOR LINEAR PREDICTING

BACKGROUND OF THE INVENTION

1. Field of the Invention

The present invention relates to method and apparatus for linear predicting, particularly method for linear predicting on received signals in mobile communications and a receiver.

2. Description of the Related Art

In mobile communications, it is a common practice to utilize a least square method as a linear prediction, for correct demodulation of transmission data requires to predict various errors and parameters such as frequency offsets, reference phases, synchronization and radio channels using a limited number of clues such as known signals and provisional judgment signals.

In a conventional least square method, all observed values are equally weighted in the process of linear predicting. This means that both of probable observed values and less probable observed values influenced equally to the result of the linear predicting.

A description of the above conventional least square method is as followed. FIG. 1 is a graph showing the principle of the conventional least square method. This FIG. 1 shows a case of applying six observation points which have regular intervals to the predicting.

FIG. 1 shows observed values 101 to 106, a predicted result 107, Euclidean distances 108 to 113, that is, margins of errors between predicted result 107 and each observed values.

Supposing predicted result 107 and Euclidean distances between observed values 101 to 106 and predicted result 107 as margins of errors 108 to 113, predicted result 107 that will minimize the sum of squares of margins of errors 108 to 113 can be calculated from expressions (1) and (2) below.

Supposing x(i) is an observation point; y(i), an observed value; "N", the number of observation points; and "Ax(i)+B", the linear expression to be obtained, "A" and "B" are calculated as follows.

$$A = \frac{N \sum_{i=0}^{N-1} \{X(i)Y(i)\} - \sum_{i=0}^{N-1} X(i) \sum_{i=0}^{N-1} Y(i)}{N \sum_{i=0}^{N-1} \{X(i)^2\} - \left(\sum_{i=0}^{N-1} X(i)\right)^2} \quad (1)$$

$$B = \frac{-A \sum_{i=0}^{N-1} X(i) + \sum_{i=0}^{N-1} Y(i)}{N} \quad (2)$$

Forcing "A" to 0 and only calculating "B", then, will give an average of y(i).

In FIG. 1, the horizontal axis represents observation points and the vertical axis represents observed values at those observation points. "A" represents the gradient of estimation result 107 and "B" represents the intercept.

FIG. 2 is a block diagram showing a configuration of a first embodiment of a receiver which utilizes the conventional least square method as linear predicting. Receiver 200 shown in FIG. 2 is one of examples of general receivers which utilize the conventional least square method to estimate a series of received signals.

Receiver 200 shown in FIG. 2 has observation apparatus 202 and least square prediction apparatus 203. Adder 201, which is not included in receiver 200, is described so as to express that received signals are added by disturbances before input into observation apparatus 202.

In the configuration, a series of signals is input to adder 201, which is supposed to be such a series of signals that can be expressed by a linear expression.

During signal propagation, disturbances like thermal noises are multiplied into a series of signals in adder 201. This result is observed by observation apparatus 202. Since the observation result includes disturbances, the observation result contains a certain margin of error even if the series of signals is one that can be expressed by a linear expression.

Least square prediction apparatus 203 estimates a prediction series by minimizing the square of the margin of error based on the aforementioned expressions (1) and (2). This allows a value close to the series of signals to be obtained as the prediction series even if disturbances exist.

FIG. 3 is a block diagram showing a configuration of a second embodiment of a receiver which utilizes the conventional least square method as linear predicting.

Receiver 300 shown in FIG. 3 has antenna 301, frequency offset compensator 302, demodulator 303, frequency offset detector 304 and least square prediction apparatus 305.

In the configuration, suppose a signal received by antenna 301 already contains disturbances. Frequency offset detector 304 detects frequency offsets from received signals.

Least square prediction apparatus 305 calculates the aforementioned expressions (1) and (2) with the detected frequency offsets to obtain probable frequency offsets, and frequency offset compensator 302 uses this prediction result to compensate received signals. By using the prediction result, demodulator 303 obtains demodulated data of better channel quality with its frequency offset compensated.

FIG. 4 is a block diagram showing a configuration of a third embodiment of a receiver which utilizes the conventional least square method as linear predicting. Receiver 400 shown in FIG. 4 is one of examples of receivers in which the conventional least square method referred to FIG. 2 is applied to phase estimation essential to detecting synchronization. In detecting synchronization, as explained in FIG. 3, even a small margin of error in frequency offset compensation deteriorates the performance, making the reference phase rotate as time goes on. This phase rotation can be expressed in a linear expression using time and phase, so the conventional least square method can be applied to compensate those phase rotation.

Even if frequency offset compensation is completed, to eliminate the influences of constant phase rotation, calculating the averaged phase and compensating the frequency offsets by utilizing the least square method or simply averaging is necessary.

Receiver 400 shown in FIG. 4 has antenna 401, phase compensator 402, demodulator 403, phase error detector 404, and least square prediction apparatus 405.

In the configuration, suppose a signal received by antenna 401 already contains disturbances. Phase compensator 402 compensates the phase shifts of the received signals based on the prediction result obtained from past received signals and demodulator 403 demodulates those result and obtains demodulated data.

Phase error detector 404 detects phase shifts based on the received signals of which phase shifts have been compensated by phase compensator 402.

Least square prediction apparatus 405 calculates the aforementioned expressions (1) and (2) with the detected phase errors to obtain probable frequency offsets, and phase compensator 302 uses this prediction result to compensate received signals. By using the prediction result, demodulator 403 obtains demodulated data of better channel quality with its phase shifts compensated.

FIG. 5 is a block diagram showing a configuration of a fourth embodiment of a receiver which utilizes the conventional least square method as linear predicting. Receiver 500 shown in FIG. 5 is one of examples of receivers in which the conventional least square method referred to FIG. 2 is applied to synchronization shift estimations. Synchronization shifts are originated due to differences in clock oscillation frequencies between transmission and reception. The least square method can be applied to the estimation of synchronization shifts because the relationship between the synchronization and the synchronization shifts can be expressed by a linear expression using time.

Receiver 500 shown in FIG. 5 has antenna 501, synchronization timing adjuster 502, demodulator 503, synchronization shift detector 504 and least square prediction apparatus 505.

In the configuration, suppose a signal received by antenna 501 already contains disturbances. Synchronization shift detector 504 detects the synchronization shifts from the received signals between transmission and reception.

Least square prediction apparatus 505 calculates the aforementioned expressions (1) and (2) with the estimated channel quality, obtains probable synchronization timing, and using this prediction result synchronization shift adjuster 502 corrects the received signals. Using this prediction result, demodulator 503 can obtain high reliability demodulated data with synchronization shifts corrected.

FIG. 6 is a block diagram showing a configuration of a fifth embodiment of a receiver which utilizes the conventional least square method as linear predicting. Receiver 600 shown in FIG. 6 is one of examples of receivers in which the conventional least square method referred to FIG. 2 is applied to channel estimations, presenting an example of diversity combined several reception.

Diversity combination requires to estimate the coefficients weighted to the received signals from each antenna. The least square method can be applied to the estimation of the coefficients for the diversity combining because the quality of the channel can be expressed by a linear expression using time and phase in a short term.

Receiver 600 shown in FIG. 6 has antennas 601 and 602, combiner 603, demodulator 604, channel impulse, response estimators 605 and 606, and least square prediction apparatuses 607 and 608.

In the configuration, suppose a signal received by antennas 601 and 602 already contains disturbances. Channel impulse response estimator 605 estimates channel impulse responses to signals received by antenna 601.

Least square prediction apparatus 607 calculates the aforementioned expressions (1) and (2) using the estimated channel quality, obtains probable channel impulse responses and gives this prediction result to combiner 603 and reflects the result in weighting processing on the signal received by antenna 601.

Channel impulse response estimator 606 estimates channel impulse responses to a signal received by antenna 602. Least square prediction apparatus 608 calculates the aforementioned expressions (1) and (2) using the observed values, obtains probable channel impulse responses and gives this prediction result to combiner 603 and reflects the result in weighting processing on the signal received by antenna 602.

Combiner 603, after the most appropriate coefficients weighted to the signals received by antennas 601 and 602, combines those received signals and obtains high reliability demodulated data through combined diversity.

However, all the receivers above use the conventional least square. method as linear predicting that weights all received signals equally. In the conventional least square method, all observed values influences equally to the linear predicting result. This means that both of the probable observed values, which has high reliability with respect to the predicted values and less probable observed values, which has low reliability due to disturbances or fading, influences equally to the result of linear predicting.

As the lower reliability the observed value has, the longer Euclidean distance becomes, containing low reliability observed values among the observed values is likely to have serious adverse effects on the predicted result using the least square method.

In other words, the least square method is a method to determine the "gradient" and "intercept, " parameters of a linear expression, that minimizes the Euclidean distance from every observation point. It is capable of predicting best when all the observation points have the same probability, but if the likelihood varies depending on the observation points, it is affected by less likely observed points, deteriorating its prediction accuracy.

For a receiver which utilizes the linear prediction for frequency offset compensation, phase compensation, synchronization shift correction and combined diversity, low accuracy of the linear prediction can result in a problem of not only reducing the accuracy of received signal correction but also increasing the error rate of the channel.

SUMMARY OF THE INVENTION

The main point of the present invention is that, it is after weighting every observed value with corresponding likelihood at every observation points that a least square method is utilized as a linear prediction to the observations, in order to improve the accuracy of the linear prediction by making the influence of the probable observed values to the prediction result larger.

The present invention can improve the accuracy of received signal correction in a receiver, by making a linear prediction more reliable, which is applied for frequency offset compensation, phase shift compensation, synchronization shift adjustment, combined diversity and other signal values estimation.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, the embodiments of the present invention are explained in detail below.

Embodiment 1

A receiver of the present embodiment weights all observed values with corresponding likelihood before utilizing a least square method for linear predicting to the observations.

Figure 1:
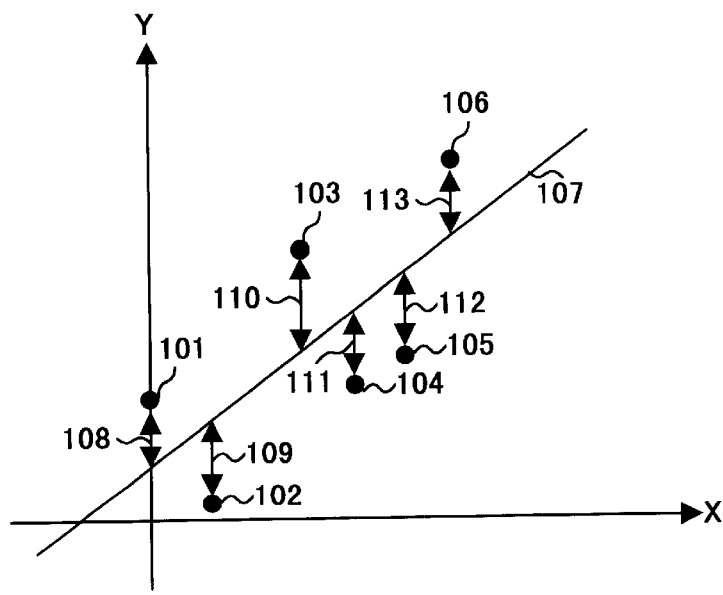
FIG. 1 is a graph showing the principle of the conventional least square method.
Figure 2:
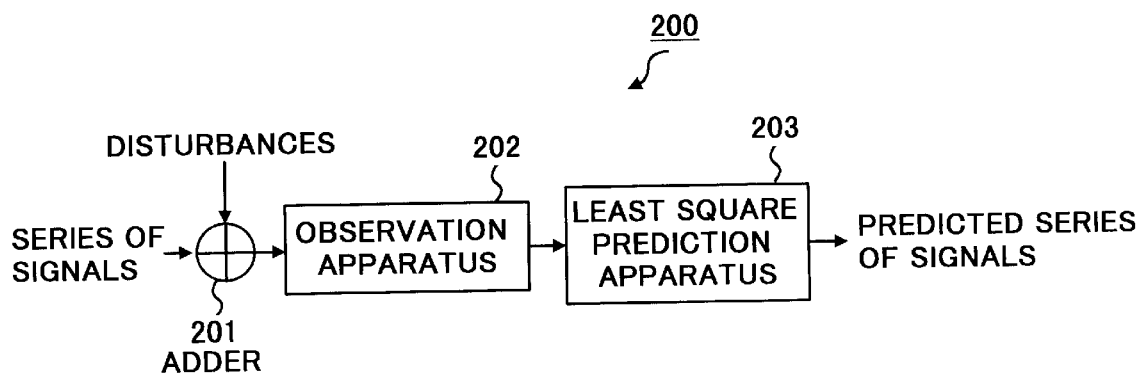
FIG. 2 is a block diagram showing a configuration of a first embodiment of a receiver which utilize the conventional least square method as linear predicting.
Figure 3:
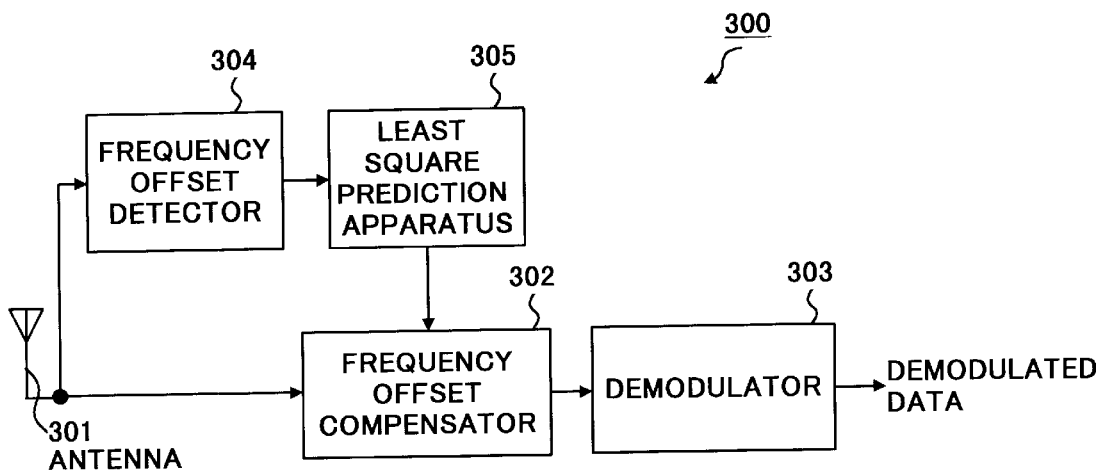
FIG. 3 is a block diagram showing a configuration of a second embodiment of a receiver which utilize the conventional least square method as linear predicting.
Figure 4:
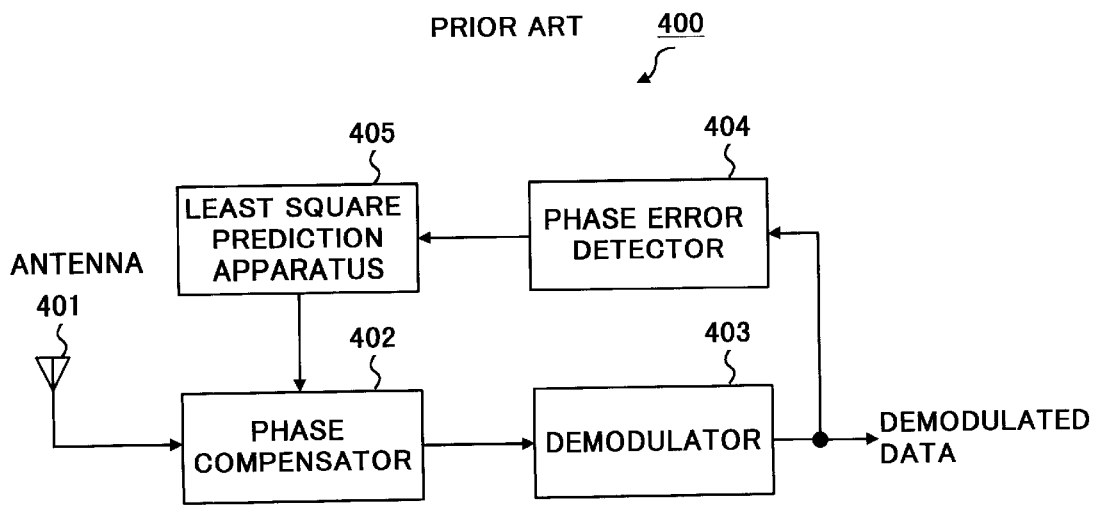
FIG. 4 is a block diagram showing a configuration of a third embodiment of a receiver which utilize the conventional least square method as linear predicting.
Figure 5:
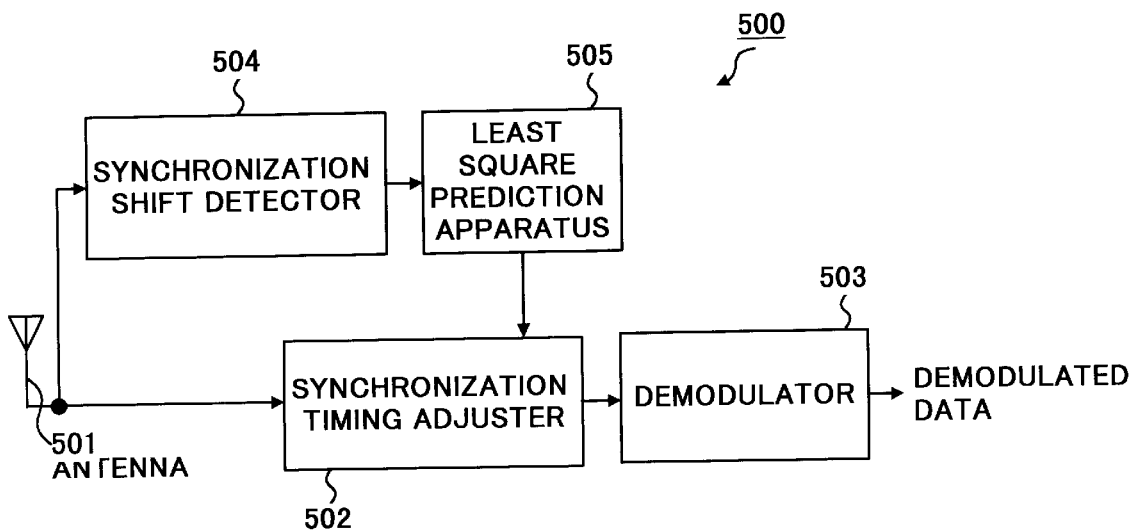
FIG. 5 is a block diagram showing a configuration of a forth embodiment of a receiver which utilize the conventional least square method as linear predicting.
Figure 6:
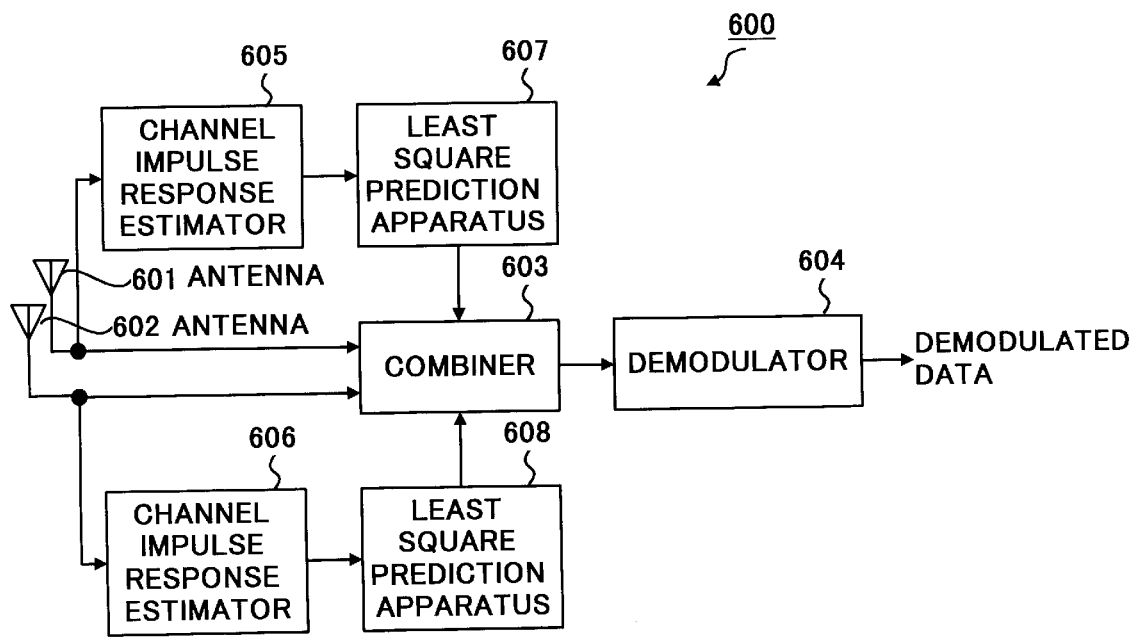
FIG. 6 is a block diagram showing a configuration of a fifth embodiment of a receiver which utilize the conventional least square method as linear predicting.
Figure 7:
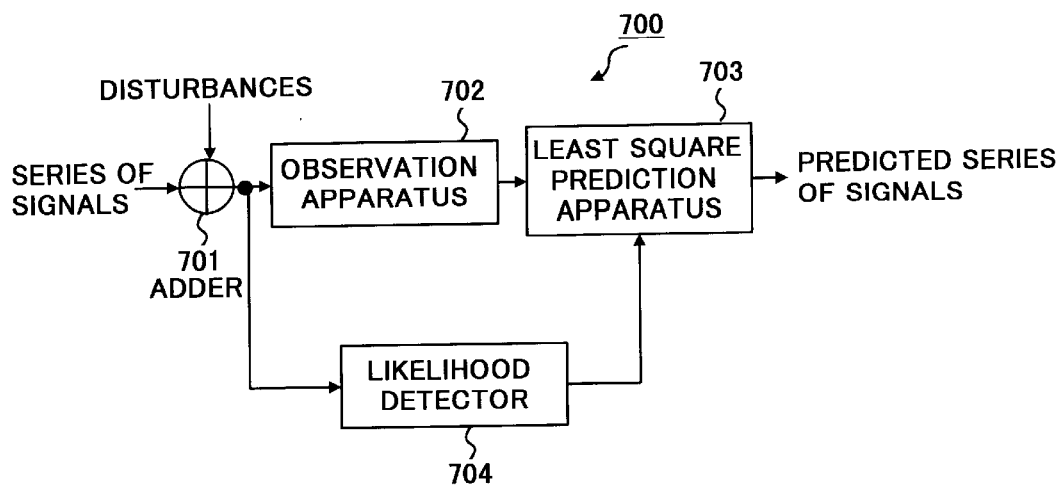
FIG. 7 is a block diagram showing a configuration of the receiver of Embodiment 1 of the present invention.

The following is an explanation about a configuration of the receiver of the present embodiment with reference to FIG. 7. FIG. 7 is a block diagram showing a configuration of the receiver of Embodiment 1 of the present invention.

In FIG. 7, receiver 700 has observation apparatus 702, least square prediction apparatus 703 and likelihood detector 704. Adder 701, which is not included in receiver 700, is described so as to express that received signals are added by disturbances before input into observation apparatus 702.

In the configuration, a series of signals is input to adder 701, which is supposed to be such a series of signals that can be expressed by a linear expression.

During signal propagation, disturbances like thermal noises are multiplied into a series of signals in adder 701. This result is observed by observation apparatus 702. Since the observation result includes disturbances, the observation result contains a certain margin of error even if the series of signals is one that can be expressed by a linear expression.

Least square prediction apparatus 703 estimates a prediction series by minimizing the square of the margin of error based on the following expressions (3) and (4). This allows a value close to the series of signals to be obtained as the prediction series even if disturbances exist.

Supposing x(i) as an observation point, y(i) as an observed value, "L" as the likelihood of y(i), "N" as $$A = \frac{\sum_{i=0}^{N-1} L(i) \cdot \sum_{i=0}^{N-1} \{L(i)X(i)Y(i)\} - \sum_{i=0}^{N-1} \{L(i)X(i)\} \cdot \sum_{i=0}^{N-1} \{L(i)Y(i)\}}{\sum_{i=0}^{N-1} L(i) \cdot \sum_{i=0}^{N-1} \{X(i)^2\} - \left(\sum_{i=0}^{N-1} \{L(i)X(i)\}\right)^2} \quad (3)$$

$$B = \frac{-A\sum_{i=0}^{N-1} \{L(i)X(i)\} + \sum_{i=0}^{N-1} \{L(i)Y(i)\}}{\sum_{i=0}^{N-1} L(i)} \quad (4)$$

the number of observation points and "Ax(i)+B" as the linear expression to be obtained, "A" and "B" are calculated as follows.

Forcing "A" to 0 and only calculating "B", then, will give an average of y(i) which weighted with the likelihood L(i).

Likelihood detector 704 detects likelihood of received signals and fixes the detected likelihood as a likelihood used by least square prediction apparatus 703. Thus, the higher reliability the observed values have, the more the observed values influence to the result of linear predicting by calculating with the aforementioned expressions (3) and (4).

As shown above, the receiver of the present embodiment weights all observed values with corresponding likelihood before utilizing a least square method for linear predicting to the observations, thus the predicted series of signals reflected each probability of the observed values improves the accuracy of linear predicting and eliminates an influence of disturbances.

Embodiment 2

A receiver of the present embodiment weights all detected frequency offsets with corresponding frame S/N before utilizing a least square method for linear predicting to the frequency offsets.

Figure 8:
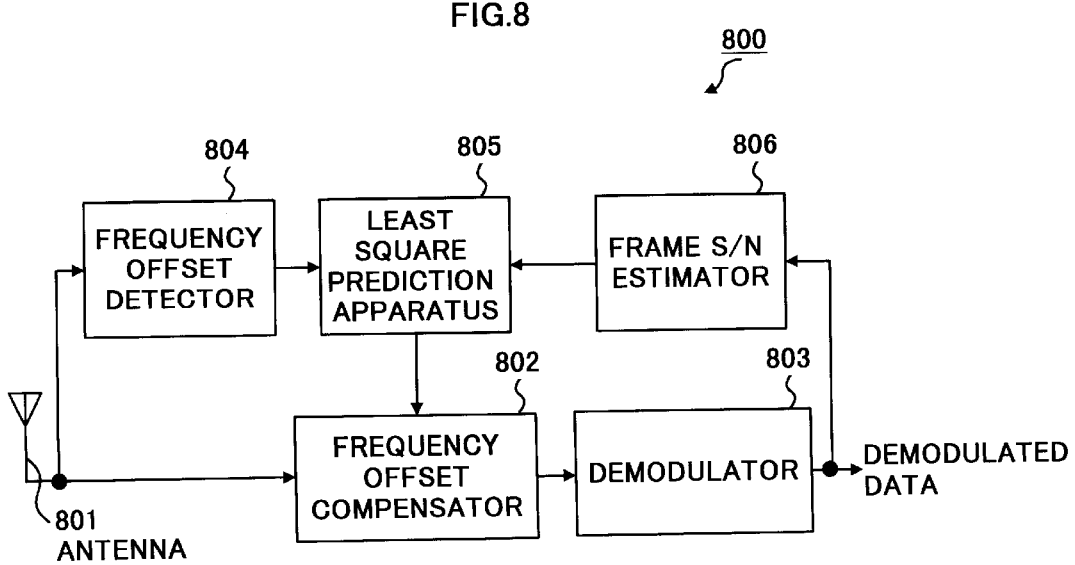
FIG. 8 is a block diagram showing a configuration of the receiver of Embodiment 2 of the present invention.

The following is an explanation about a configuration of the receiver of the present embodiment with reference to FIG. 8. FIG. 8 is a block diagram showing a configuration of the receiver of Embodiment 2 of the present invention.

Receiver 800 shown in FIG. 8 has antenna 801, frequency offset compensator 802, demodulator 803, frequency offset detector 804, least square prediction apparatus 805 and frame S/N estimator 806.

In the configuration, signals received by antenna 801 already contains disturbances. Frequency offset detector 804 detects frequency offsets between transmission and reception from received signals.

Least square prediction apparatus 805 calculates the aforementioned expressions (3) and (4) with the detected frame S/N to obtain probable frequency offsets, and frequency offset compensator 802 uses this prediction result to compensate received signals. By using the prediction result, demodulator 803 obtains demodulated data of better channel quality with its frequency offset compensated.

Frame S/N estimator 806 estimates values of frame S/N of received signals and fixes the estimated frame S/N as a likelihood used by least square prediction apparatus 805. Thus, the better S/N the detected frequency offsets of received signals have, the more the detected frequency offsets influence to the result of linear predicting by calculating with the aforementioned expressions (3) and (4).

As shown above, the receiver of the present embodiment weights all detected frequency offsets with corresponding frame S/N before utilizing a least square method for linear predicting to the detected frequency offsets, thus the predicted series of signals reflected each probability of the detected frequency offsets improves the accuracy of linear predicting and eliminates an influence of disturbances.

Embodiment 3

A receiver of the present embodiment weights all detected phase errors with corresponding amplitudes before utilizing a least square method for linear predicting to the phase shifts.

Figure 9:
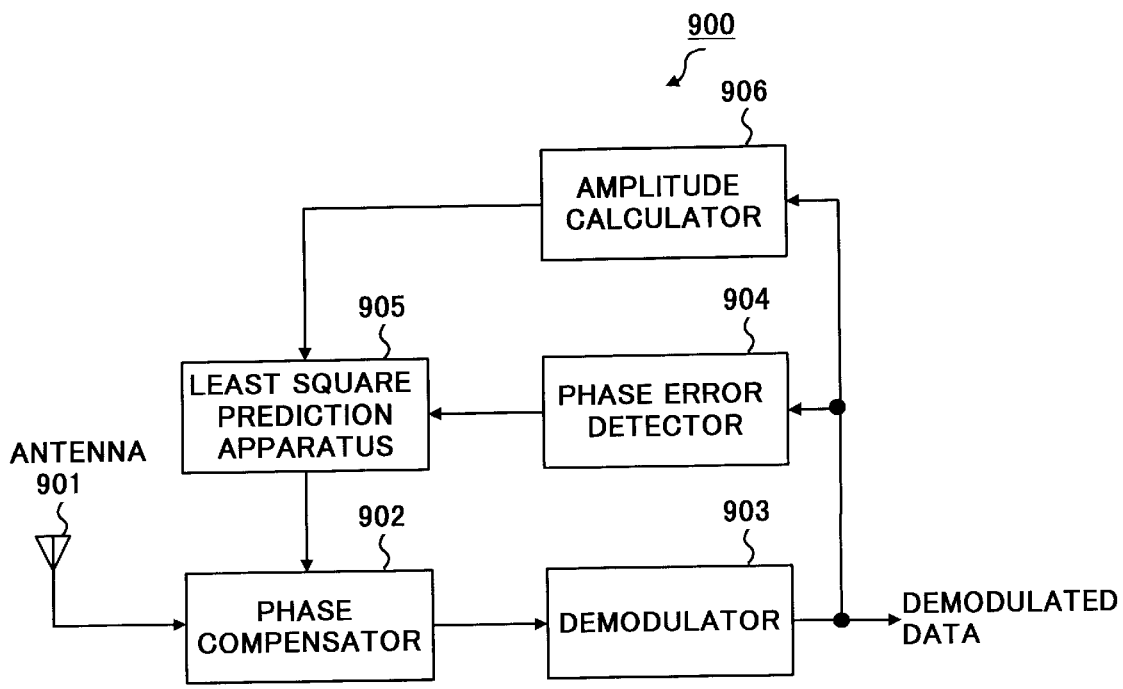
FIG. 9 is a block diagram showing a configuration of the receiver of Embodiment 3 of the present invention.

The following is an explanation about a configuration of the receiver of the present embodiment with reference to FIG. 9. FIG. 9 is a block diagram showing a configuration of the receiver of Embodiment 3 of the present invention.

Receiver 900 shown in FIG. 9 has antenna 901, phase compensator 902, demodulator 903, phase error detector 904, least square prediction apparatus 905 and amplitude calculator 906.

In the configuration, suppose a signal received by antenna 901 already contains disturbances. Phase compensator 902 compensates the phase shifts of the received signals based on the prediction result obtained from past received signals and demodulator 903 demodulates those result and obtains demodulated data.

Phase error detector 404 detects phase shifts based on the received signals of which phase shifts have been compensated by phase compensator 902.

Least square prediction apparatus 905 calculates the aforementioned expressions (3) and (4) with the detected amplitudes to obtain probable phase shifts, and phase compensator 902 uses this prediction result to compensate received signals. By using the prediction result, demodulator 903 obtains demodulated data of better channel quality with its phase shifts compensated.

As shown above, the receiver of the present embodiment weights all detected phases with corresponding phase errors before utilizing a least square method for linear predicting to the detected phases, thus the predicted series of signals reflected each probability of the detected phases improves the accuracy of linear predicting and eliminates an influence of disturbances.

Embodiment 4

A receiver of the present embodiment weights all detected synchronization shifts with corresponding channel quality before utilizing a least square method for linear predicting to the synchronization shifts.

Figure 10:
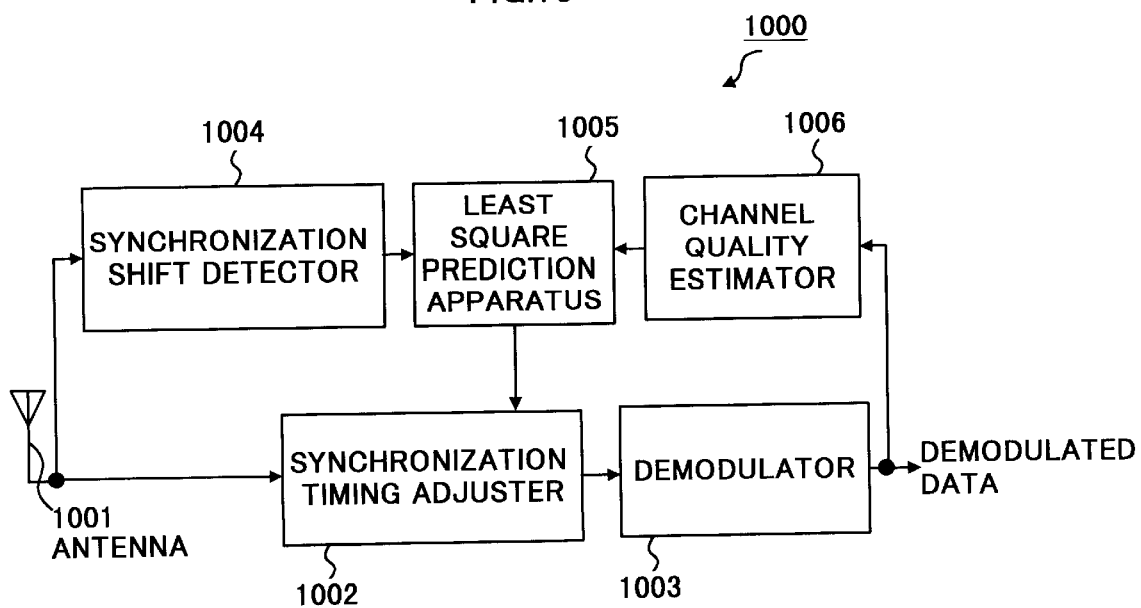
FIG. 10 is a block diagram showing a configuration of the receiver of Embodiment 4 of the present invention.

The following is an explanation about a configuration of the receiver of the present embodiment with reference to FIG. 10. FIG. 10 is a block diagram showing a configuration of the receiver of Embodiment 4 of the present invention.

Receiver 1000 shown in FIG. 10 has antenna 1001, synchronization timing adjuster 1002, demodulator 1003, synchronization shift detector 1004, least square prediction apparatus 1005 and channel quality estimator 1006.

In the configuration, suppose a signal received by antenna 1001 already contains disturbances. Synchronization shift detector 1004 detects the synchronization shifts from the received signals between transmission and reception.

Least square prediction apparatus 1005 calculates the aforementioned expressions (3) and (4) with the estimated channel quality, obtains probable synchronization timing, and using this prediction result synchronization shift adjuster 502 corrects the received signals. Using this prediction result, demodulator 1003 can obtain high reliability demodulated data with synchronization shifts corrected.

As shown above, the receiver of the present embodiment weights all detected synchronization shifts with corresponding channel quality before utilizing a least square method for linear predicting to the detected synchronization shifts, thus the predicted series of signals reflected each probability of the detected synchronization shifts improves the accuracy of linear predicting and eliminates an influence of disturbances.

Embodiment 5

A receiver of the present embodiment weights all estimated channel impulse responses with corresponding channel quality before utilizing a least square method for linear predicting to the channel impulse responses.

Figure 11:
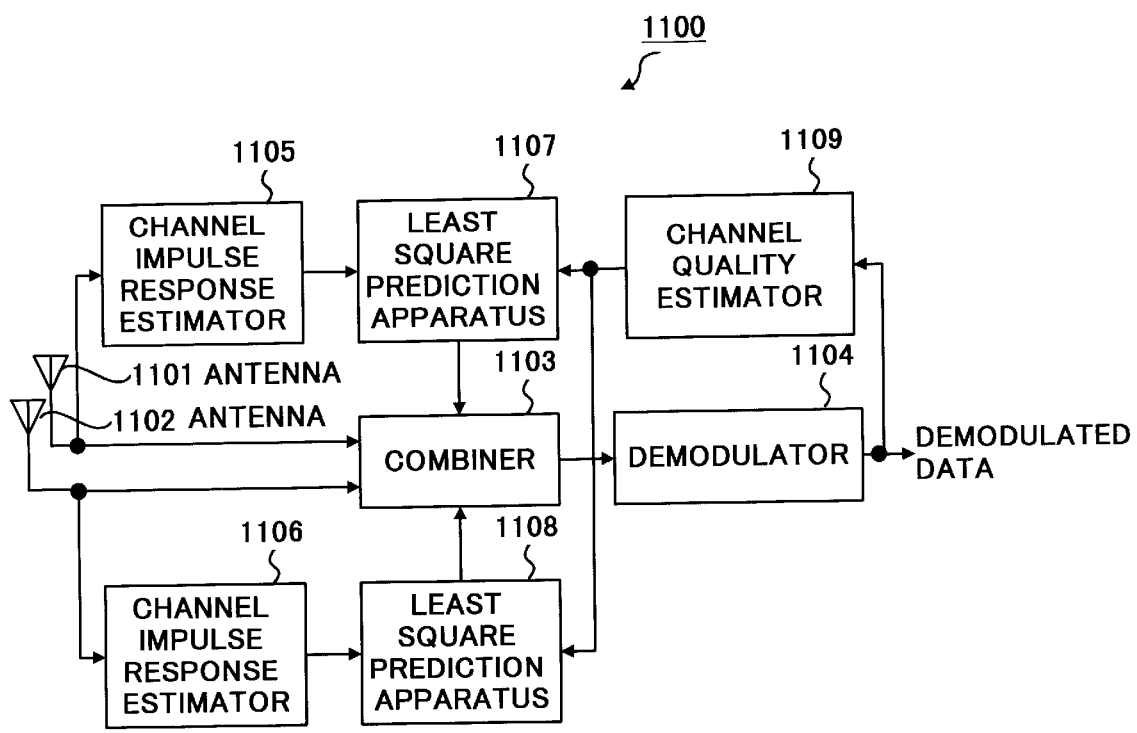
FIG. 11 is a block diagram showing a configuration of the receiver of Embodiment 5 of the present invention.

The following is an explanation about a configuration of the receiver of the present embodiment with reference to FIG. 11. FIG. 11 is a block diagram showing a configuration of the receiver of Embodiment 5 of the present invention.

Receiver 1100 shown in FIG. 11 has antennas 1101 and 1102, combiner 1103, demodulator 1104, channel impulse response estimators 1105 and 1106, least square prediction apparatuses 1107 and 1108 and channel quality estimator 1109.

In the configuration, suppose a signal received by antennas 1101 and 1102 already contains disturbances. Channel impulse response estimator 1105 estimates channel impulse responses to signals received by antenna 1101.

Least square prediction apparatus 1107 calculates the aforementioned expressions (3) and (4) using the estimated channel quality, obtains probable channel impulse responses and gives this prediction result to combiner 1103 and reflects the result in weighting processing on the signal received by antenna 1101.

Channel impulse response estimator 1106 estimates channel impulse responses to a signal received by antenna 1102. Least square prediction apparatus 1108 calculates the aforementioned expressions (3) and (4) using the estimated channel quality, obtains probable channel impulse responses and gives this prediction result to combiner 1103 and reflects the result in weighting processing on the signal received by antenna 1102.

Combiner 1103, after the most appropriate coefficients weighted to the signals received by antennas 1101 and 1102, combines those received signals and obtains high reliability demodulated data through combined diversity.

As shown above, the receiver of the present embodiment weights all estimated channel impulse responses with corresponding channel quality before utilizing a least square method for linear predicting to the estimated channel impulse responses, thus the predicted series of signals reflected each probability of the estimated channel impulse responses improves the accuracy of linear predicting and eliminates an influence of disturbances.

As explained above, in the present invention, it is after weighting all observed values with each likelihood at the observation points that a least square method is utilized as a linear prediction to the observations, in order to improve the accuracy of the linear prediction by making the influence of the probable observed values to the prediction result larger.

So, the present invention can improve the accuracy of received signal correction in a receiver, by making a linear prediction more reliable, which is applied for frequency offset compensation, phase shift compensation, synchronization shift adjustment, combined diversity and other signal value estimation.

The present invention is not limited to the above described embodiments, and various variations and modifications may be possible without departing from the scope of the present invention.

This application is based on the Japanese Patent Application No.HEI10-141231 filed on May 22, 1998, of which entire content is expressly incorporated by reference herein.

What is claimed is:

1. A linear predictor, comprising:
signal value detector that observes signals including disturbances at a plurality of observation points and detects a value of the every observed signal;
likelihood detector that detects a likelihood of every said observed value; and
least square predictor that, after weighting said observed values with corresponding said detected likelihood, applies a least square method to said weighted observed values.

2. A communication terminal, having the linear predictor of claim 1.

3. A base station, having the linear predictor of claim 1.

4. A receiver, comprising:
frequency offset detector that detects values of frequency offsets of received signals at a plurality of detecting points;
least square predictor that, after weighting said detected values with corresponding likelihood at every detecting point, applies a least square method for linear predicting of frequency offsets to said weighted detected values;
frequency offset compensator that compensates frequency offsets of received signals with the result of said linear predicting; and
likelihood fixer that demodulates said compensated received signals, estimates a frame S/N from said demodulated signals at every said detecting point, and fixes each estimated S/N as the likelihood utilized for said linear predicting at corresponding said detecting point.

5. A receiver, comprising:
phase error detector that detects values of phase errors of already received and demodulated signals at a plurality of detecting points;
least square predictor that, after weighting said detected values with corresponding likelihood at every detecting point, applies a least square method for linear predicting of phase errors to said weighted detected values;
phase compensator that compensates phase errors of received signals with the result of said linear predicting;
likelihood fixer that demodulates said compensated received signals, detects an amplitude value from said demodulated signals at every said detecting point, and fixes each detected amplitude value as the likelihood utilized for said linear predicting at corresponding detecting point.

6. A receiver, comprising:
synchronization shift detector that detects values of synchronization shifts of received signals at a plurality of detecting points;
least square predictor that, after weighting said detected values with corresponding likelihood at every detecting point, applies a least square method for linear predicting of synchronization shifts to said weighted detected values;
synchronization shift adjuster that adjusts the synchronization shifts of received signals with the result of said linear predicting;
likelihood fixer that demodulates said adjusted received signals, detects a channel quality from said demodulated received signals at every said detecting point, and fixes each detected channel quality information as the likelihood utilized for said linear predicting at corresponding said detecting point.

7. A receiver, comprising:
impulse response estimator that estimates values of impulse responses of signals received from a plurality of antennas respectively at a plurality of estimating points;
least square predictor that, after weighting said estimated values with corresponding likelihood at every estimating point, applies a least square method for linear predicting of impulse responses to said weighted estimated values;
diversity combiner that, after weighting every said signal received from a plurality of antennas respectively with corresponding said weighted estimated values, combines said weighted signals received from a plurality of antennas, and demodulates said combined signals; and
likelihood fixer that detects a channel quality from said demodulated signals at every said estimating point, and fixes each detected channel quality information as the likelihood utilized for said linear predicting of impulse responses at corresponding said estimating point.

8. A method of linear predicting, comprising:
observing signals including disturbances at a plurality of observation points;
detecting a value and a likelihood of the every observed signal;
weighting said observed values with corresponding said detected likelihood; and
applying a least square method to said weighted observed values.

9. A method of receiving, comprising:
detecting values of frequency offsets of received signals at a plurality of detecting points;
weighting said detected values with corresponding likelihood at every detecting point;
applying a least square method for linear predicting of frequency offsets to said weighted detected values;
compensating frequency offsets of received signals with the result of said linear predicting;
demodulating said compensated received signals;
estimating a frame S/N from said demodulated signals at every said detecting point; and
fixing each estimated S/N as the likelihood utilized for said linear predicting at corresponding said detecting point.

10. A method of receiving, comprising:
detecting values of phase errors of already received and demodulated signals at a plurality of detecting points;
weighting said detected values with corresponding likelihood at every detecting point;
applying a least square method for linear predicting of phase errors to said weighted detected values;
compensating phase errors of received signals with the result of said linear predicting;
demodulating said compensated received signals;
detecting an amplitude value from said demodulated signals at every said detecting point; and
fixing each detected amplitude value as the likelihood utilized for said linear predicting at corresponding detecting point.

11. A method of receiving, comprising:
detecting values of synchronization shifts of received signals at a plurality of detecting points;
weighting said detected values with corresponding likelihood at every detecting point;
applying a least square method for linear predicting of synchronization shifts to said weighted detected values;
adjusting the synchronization shifts of received signals with the result of said linear predicting;
demodulating said adjusted received signals;
detecting a channel quality from said demodulated received signals at every said detecting point; and
fixing each detected channel quality information as the likelihood utilized for said linear predicting at corresponding said detecting point.

12. A method of receiving, comprising:

estimating values of impulse responses of signals received from a plurality of antennas respectively at a plurality of estimating points;

weighting said estimated values with corresponding likelihood at every estimating point;

applying a least square method for linear predicting of impulse responses to said weighted estimated values;

weighting every said signal received from a plurality of antennas respectively with corresponding said weighted estimated values;

combining said weighted signals received from a plurality of antennas;

demodulating said combined signals;

detecting a channel quality from said demodulated signals at every said estimating point; and fixing each detected channel quality information as the likelihood utilized for said linear predicting of impulse responses at corresponding said estimating point.

* * * * *